No. 765,945. PATENTED JULY 26, 1904.
J. J. WEILER.
FREELY ROTATABLE WHEEL WITH BACKWARD BRAKE.
APPLICATION FILED NOV. 7, 1902.
NO MODEL. 2 SHEETS—SHEET 1.

Witnesses
Ferdinand König
Friedrich Wilhelm Ziegler

Inventor
Johann Jakob Weiler

No. 765,945. PATENTED JULY 26, 1904.
J. J. WEILER.
FREELY ROTATABLE WHEEL WITH BACKWARD BRAKE.
APPLICATION FILED NOV. 7, 1902.
NO MODEL. 2 SHEETS—SHEET 2.
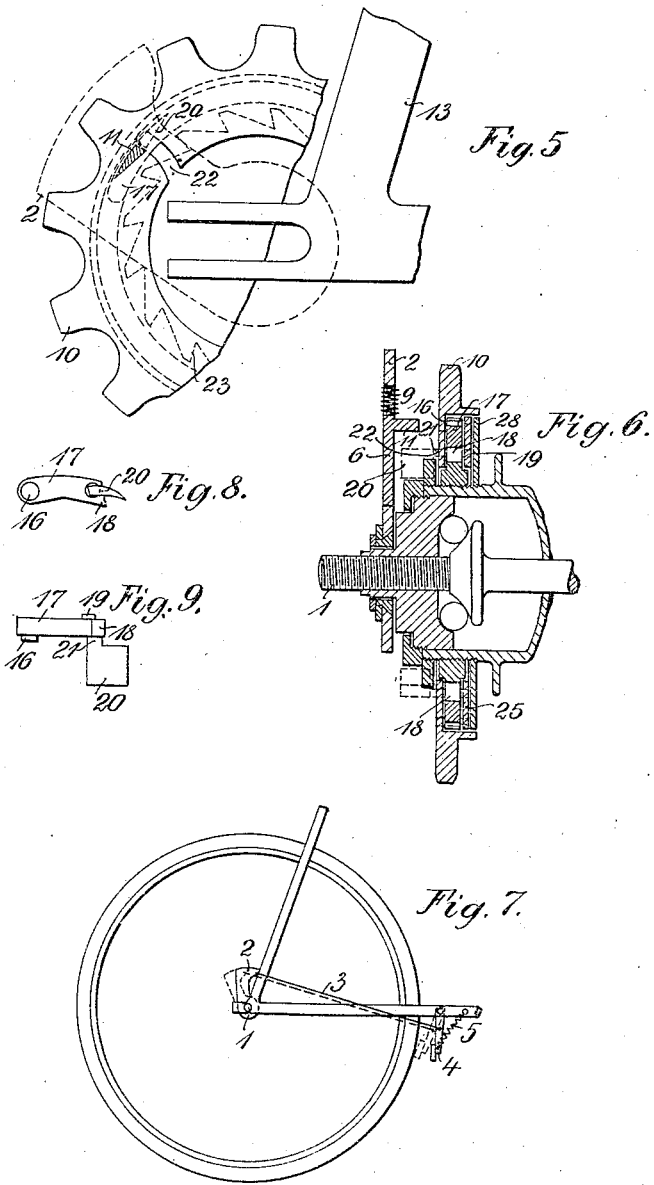

No. 765,945.  
Patented July 26, 1904.

UNITED STATES PATENT OFFICE.

JOHANN JAKOB WEILER, OF MÖRCHINGEN, GERMANY.

FREELY-ROTATABLE WHEEL WITH BACKWARD BRAKE.

SPECIFICATION forming part of Letters Patent No. 765,945, dated July 26, 1904.

Application filed November 7, 1902. Serial No. 130,402. (No model.)

*To all whom it may concern:*

Be it known that I, JOHANN JAKOB WEILER, watchmaker and goldsmith, and a subject of the German Emperor, residing at 6 Marktplatz, in the city of Mörchingen, in German Lorraine, in the German Empire, have invented a certain new and useful Freely-Rotatable Wheel with Backward Brake, of which the following is a specification.

This invention has reference to a freely-rotating wheel with a brake operated on working backward.

The invention comprises a peculiar construction of the operating-gear of the freely-rotating wheel and the manner in which the gear is made to actuate the braking parts.

Figure 1:
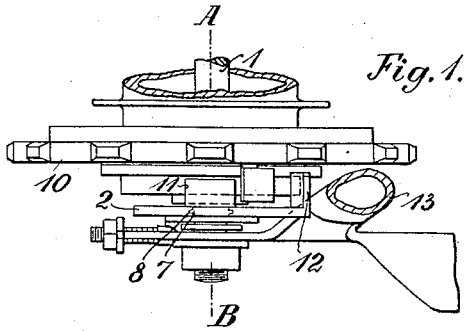
Figure 2:
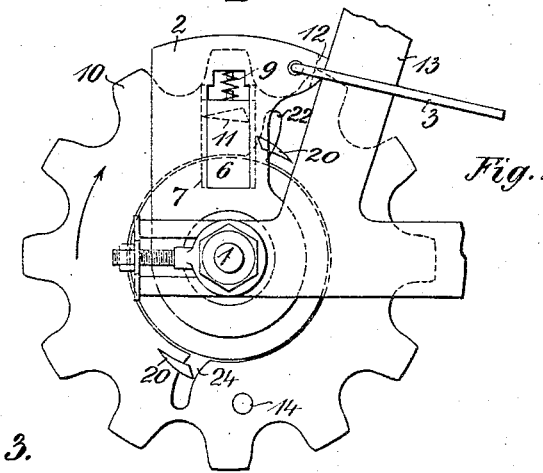
Figure 3:
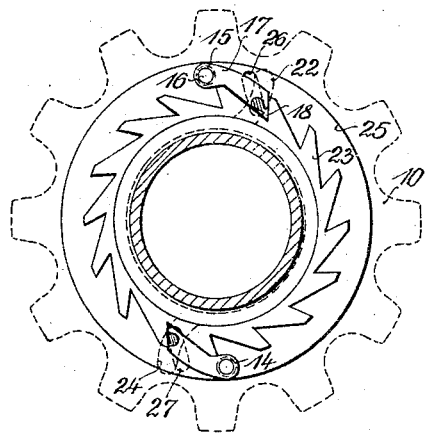
Figure 4:
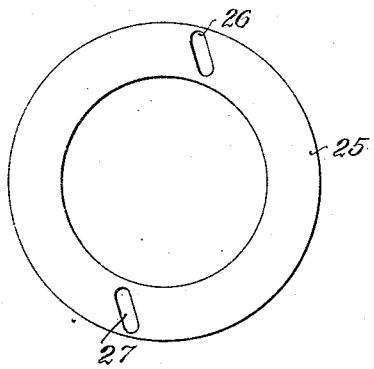

On the accompanying drawings my invention is shown, by way of example, in Figure 1 in plan view. Fig. 2 is a front elevation. Fig. 3 is another front view with the sprocket-wheel removed. Fig. 4 shows a detail of Fig. 3 in side view. Fig. 5 is a front view. Fig. 6 is a section on the line A B of Fig. 1. Fig. 7 is a side view. Fig. 8 is also a side view. Fig. 9 is a plan view.

Upon the stationary shaft 1 the braking-lever 2 is rotatably mounted and is connected to the support 4 of the brake-shoe by wire connection 3, Fig. 7. The support 4 is under the influence of the spring 5, so that upon the lever 2 being moved to assume the position shown in dotted lines in Fig. 7 the brake-shoe is forced against the rear wheel against the pull of the spring 5 and effects the braking, while when the brake is released all the parts are restored to the original normal position. (Shown in Fig. 7 of the drawings.)

The movement of the lever 2 is effected in the following manner: Upon the lever 2 is mounted a slide 6, provided with a projection 7, which is displaceable in the groove 8 of the lever 2 and which is retained in the position of Fig. 2 by the action of the spring 9. Upon the side of the slide 6 opposite to the sprocket-wheel 10 I provide a dog 11, which is rigidly secured to the slide. 12 is a projection of the braking-lever, allowing the latter to rest against the rear-wheel fork 13.

The sprocket-wheel 10, mounted so as to be freely rotatable upon the wheel-hub, is provided with two holes 14 15. (See also Fig. 3.) Of these the hole 15 serves as a journal for the pivot 16 of a dog or pawl 17, Figs. 8 and 9, the pivot 16 being rotatable in the journal 15. The extension 18 of the pawl is provided at one side with a pin 19 and at the other side with a dog 20. The pawl 18 and dog 20 are connected by a neck 21, by means of which the dog 17 is guided in the slot 22 of the sprocket-wheel. Thus the part 20 is situated between the sprocket-wheel and the brake-lever 2, the pawl 18 being at the rear side of the sprocket-wheel. Upon this side I also arrange the ratchet-wheel 23, Fig. 3, which is rigidly secured to the wheel-hub and along which the ratchet-pawl 18 is free to move. Another dog, being otherwise of the same shape as the part 17, is arranged within the hole 14 of the sprocket-wheel, so as to be rotatable therein, the neck 21 of this dog being displaceable in the slots 24 of the sprocket-wheel 10. A disk 25 (see also Fig. 4) is rotatably and frictionally mounted upon the hub 23 of the sprocket-wheel. This disk is provided with two inclined slots 26 27, which are in engagement with the guide-pins 19 of the dogs 17. At the rear of the said disk 25 I arrange a protective disk or guard 28, Fig. 6, which is rigidly connected to the hub of the wheel.

The device herein described operates as follows: When the sprocket-wheel 10 is rotated in the forward direction, it will run faster than the disk 25, which is journaled with greater friction, and in view of the pins 19 sliding within the slots 26 27 the ratchet-pawls 18 will catch behind corresponding teeth of the ratchet-wheel 23, so as to assume the position indicated in Fig. 3, so that when the sprocket-wheel performs its forward rotation the ratchet-wheel 23 and the driving-wheel itself will be moved in the forward direction. During this movement the dogs 20 impinge against the dog 11, which is thereby lifted against the tension of the spring 9 sufficiently to allow them to pass below the dog 11. If it is desired to apply the brake by counter-pressure upon the pedals, which causes the sprocket-wheel to be rotated in the backward direction, the ratchet-pawls 18 become disengaged from the ratchet-wheel 23, being raised by the continued rotation of the parts 23 25 and by the long edge of the ratchet-teeth and by the pins 19, respectively, which are raised on an incline in the slots 26 27. By this means, however, the dogs 20 are raised sufficiently so that upon the movement of the dog 11 they do not move past the said dog 20 any more, but will impinge against the same, Fig. 5, in consequence whereof and in view of the parts 11 and 20 striking against each other the braking-lever 2 assumes the position shown in pointed lines in Figs. 5 and 7 of the drawings, whereby the braking action is effected.

I am aware that it is old to operate a brake in so-called "free-wheel" cycles by means of pawls positively connected to or actuated by the freely-rotating sprocket-wheel of such free-wheel or coasting cycles; but in all these constructions the device acted directly upon the tire of the wheel from the outside or the braking action was effected upon the hub of the wheel only, in either of which cases the brake was liable to slip, which inconvenience is avoided or greatly reduced in my present invention, where a braking-lever is rotatably mounted upon the hub of the wheel and the braking action is effected from the center toward the outside of the wheel.

What I claim, and desire to secure by Letters Patent of the United States, is—

In a coasting bicycle-wheel, the combination with a wheel-hub, a driving-wheel, a wheel-shaft and a freely-rotating sprocket-wheel upon said wheel-hub, and pawls, rotatably mounted in said sprocket-wheel, of a brake-lever rotatable on said wheel-shaft, a slide guided upon said brake-lever, means to rotate said pawls and means on said slide to engage with said pawls in certain positions of the same.

In witness whereof I have hereunto set my hand in presence of two witnesses.

JOHANN JAKOB WEILER.

Witnesses:
  M. L. Brittain,
  Emil Frank.